T. E. MURRAY.
METHOD OF PRODUCING SOLID RIBS ON SHEET METAL TUBES.
APPLICATION FILED DEC. 23, 1916.
1,220,773. Patented Mar. 27, 1917.
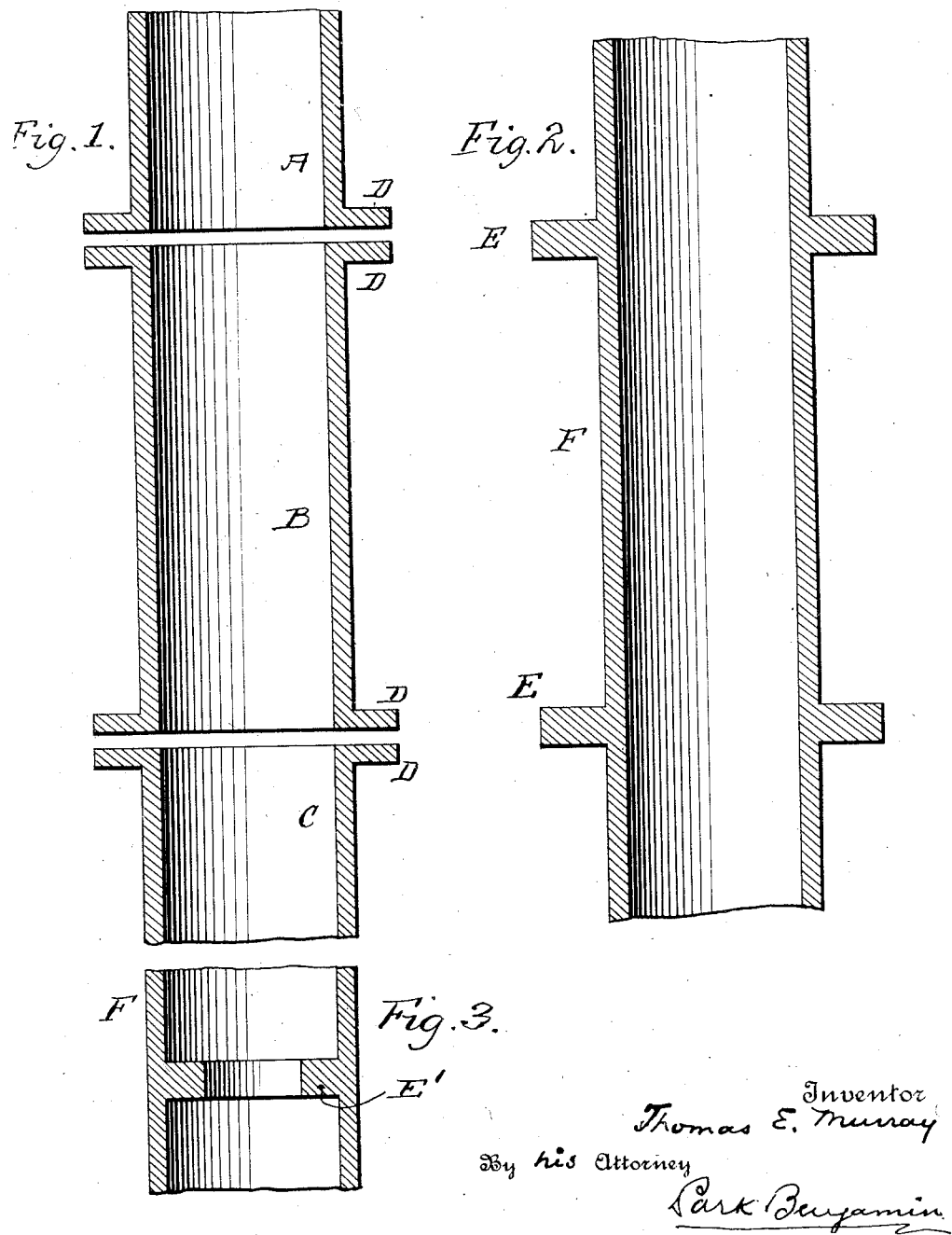

UNITED STATES PATENT OFFICE.

THOMAS E. MURRAY, OF NEW YORK, N. Y.

METHOD OF PRODUCING SOLID RIBS ON SHEET-METAL TUBES.

1,220,773.

Specification of Letters Patent. Patented Mar. 27, 1917.

Application filed December 23, 1916. Serial No. 138,600.

*To all whom it may concern:*

Be it known that I, THOMAS E. MURRAY, a citizen of the United States, residing at New York, in the county of New York and State of New York, have invented a certain new and useful Improvement in Methods of Producing Solid Ribs on Sheet-Metal Tubes, of which the following is a specification.

The invention is a method of producing solid ribs on sheet metal tubes for strengthening said tubes, or for increasing their superficial area, or for any other desired purpose.

In the accompanying drawings—

Figure 1 shows a plurality of tube sections having outwardly turned flanges which are to be united together to form the complete tube. Fig. 2 shows said tube completed. Fig. 3 shows a joint of the completed tube made from flanges inwardly instead of outwardly turned.

Similar letters of reference indicate like parts.

In carrying my method into effect, I prepare a number of tube sections, as A, B, C, of sheet metal and on the ends of each section I form similar integral flat faced flanges D. The flanges D are all alike. I place two sections A, B end to end, with their flanges D registering and in contact, and I join said flanges by electrical welding, whereby said flanges become homogeneously united and form a solid rib E, Figs. 2 and 3. I may then attach the section C in the same way to section B, and in like manner continue adding sections until the completed tube F is of the desired length.

In Figs. 1 and 2, I have shown the flanges D turned outwardly so as to produce the ribs E on the outer circumferential periphery of the tube. I may, however, turn the flanges inwardly, welding them together, as already described, to form ribs E' on the inner circumferential periphery of the tube. Where the tube is to be used, for example, as part of a radiator, the flanges may be turned outward, as shown in Figs. 1 and 2, to increase the radiating surface. On the other hand, where the tube is to be used as a wheel spoke, in which case a smooth outer periphery is desirable, the flanges are preferably turned inward, as shown in Fig. 3. In either case, the ribs produced act to strengthen the tube.

I claim:

1. The method of making a solid circumferential homogeneous rib on a sheet metal tube, which consists in forming similarly turned flat faced flanges on the ends of two tube sections, placing the flange of one section against and registering with the flange of the other section, and electrically welding said flanges to form said rib.

2. The method of making a plurality of solid circumferential homogeneous ribs on a sheet metal tube, which consists in forming similarly turned flat faced flanges on the ends of two tube sections, placing the flange of one section against and registering with the flange of the other section, and electrically welding said flanges, adding a third flanged section to the free end of one of the sections so united, and electrically welding said third section in place, and so on until a ribbed tube of desired length is produced.

In testimony whereof I have affixed my signature in presence of two witnesses.

THOMAS E. MURRAY.

Witnesses:
GERTRUDE T. PORTER,
MAY T. McGARRY.